Dec. 1, 1936.  W. R. POSTLEWAITE  2,062,527
PIPE TESTING APPARATUS
Filed Feb. 25, 1935  2 Sheets-Sheet 1

Inventor
WILLIAM R. POSTLEWAITE

By: *[signature]*
Attorney

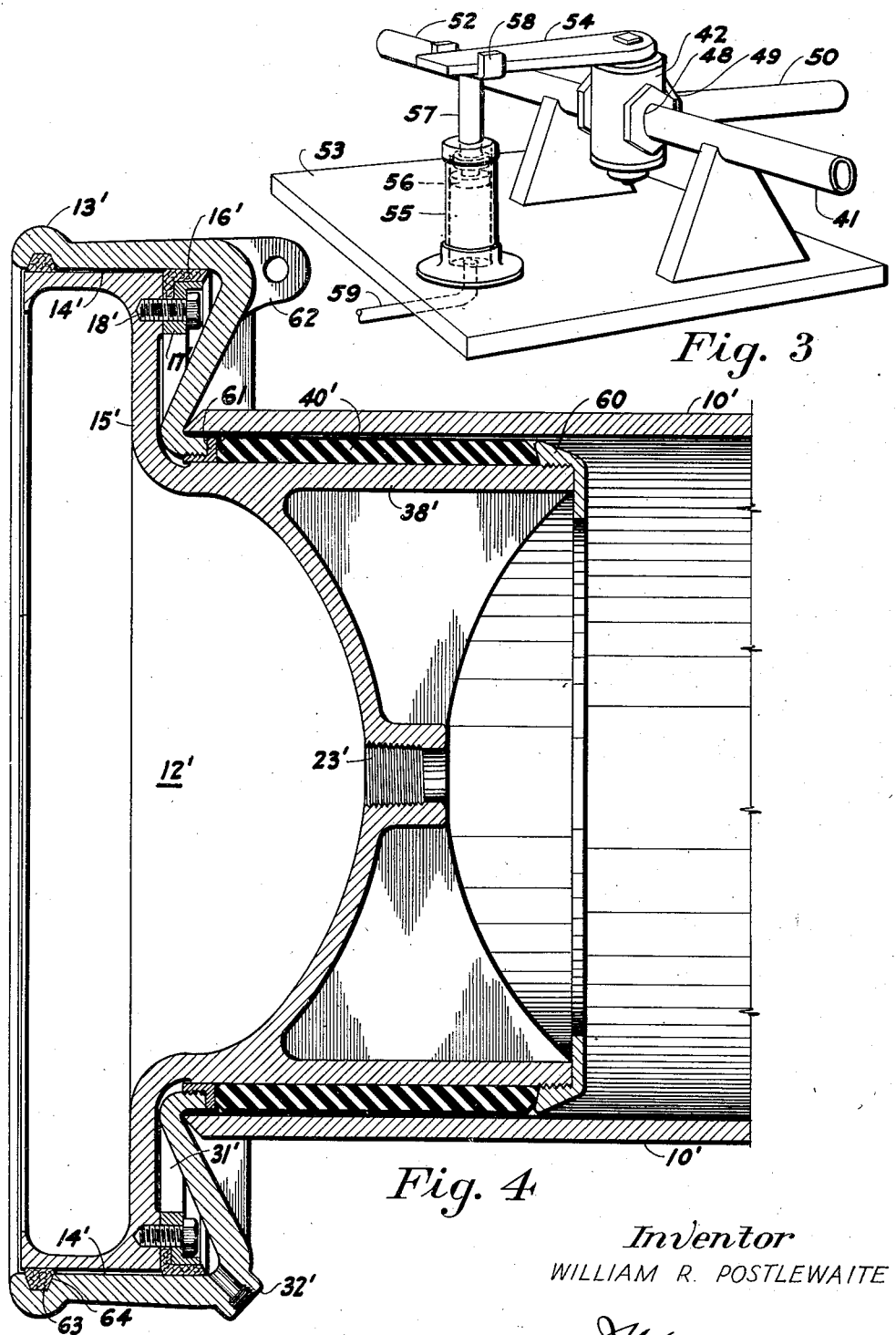

Patented Dec. 1, 1936

2,062,527

UNITED STATES PATENT OFFICE 2,062,527

PIPE TESTING APPARATUS

William R. Postlewaite, San Francisco, Calif., assignor to Standard Oil Company of California, San Francisco, Calif., a corporation of Delaware Application February 25, 1935, Serial No. 7,987

8 Claims. (Cl. 73—51)

This invention relates to the hydrostatic pressure testing of hollow cylindrical bodies, and particularly to apparatus for testing lengths of steel pipe or the like for tightness and strength.

Heretofore, lengths of pipe and the like have been tested with air or water pressure, either at a shop or central location where facilities were available for clamping the pipe between movable heads, or in the field by means of plugs or caps which were temporarily secured to the two ends of the pipe, after which the testing fluid was admitted to the interior of the pipe under the pressure desired.

The latter situation involved plugs secured to the ends of the pipe by set screws which required manual setting up and unscrewing each time a section was tested. In the case of large diameter pipes and high test pressures, the labor involved, as well as the hazard introduced by improperly tightened plugs, which would blow out with great force, made such testing very slow and expensive, as well as dangerous to equipment and operators alike.

It is an object of this invention to provide an apparatus for testing lengths of pipe and the like, in which there will be a minimum of manual operations involved, and in which the hazard from accidental release of the test fluid will be reduced to a minimum.

Another object is to provide an apparatus of this nature which will be readily portable and thus adapted for field testing.

Another object is to provide an apparatus in which the proper sequence of operations will automatically be maintained thus making it adaptable to unskilled operators.

A further object is to provide an apparatus of this type in which the pressure of the test fluid may be utilized for a dual purpose, that of holding the plugs or stoppers tightly in place in the ends of the pipe being tested, as well as a medium for actually making the test desired, with a differential action whereby the force holding the stoppers in place is always greater than that tending to blow them out.

Yet another object is to provide a means for closing the end of a cylinder by an externally applied fluid pressure acting upon a piston, the force of which is applied to a resilient member that is deformed to grip the cylinder wall and also to provide a fluid tight joint therewith.

These and other objects and advantages will be more fully apparent from the following description and from the appended drawings, which form a part of this specification and illustrate a preferred embodiment of this invention, as applied to testing pipe with air.

In the drawings:

Figure 3 is a perspective view of an interlocking valve controlling the admission and release of test fluid to the pipe and stoppers.

Figure 4 is a longitudinal sectional view of an alternative and simpler form of stopper than in Figure 1.

Figure 1:
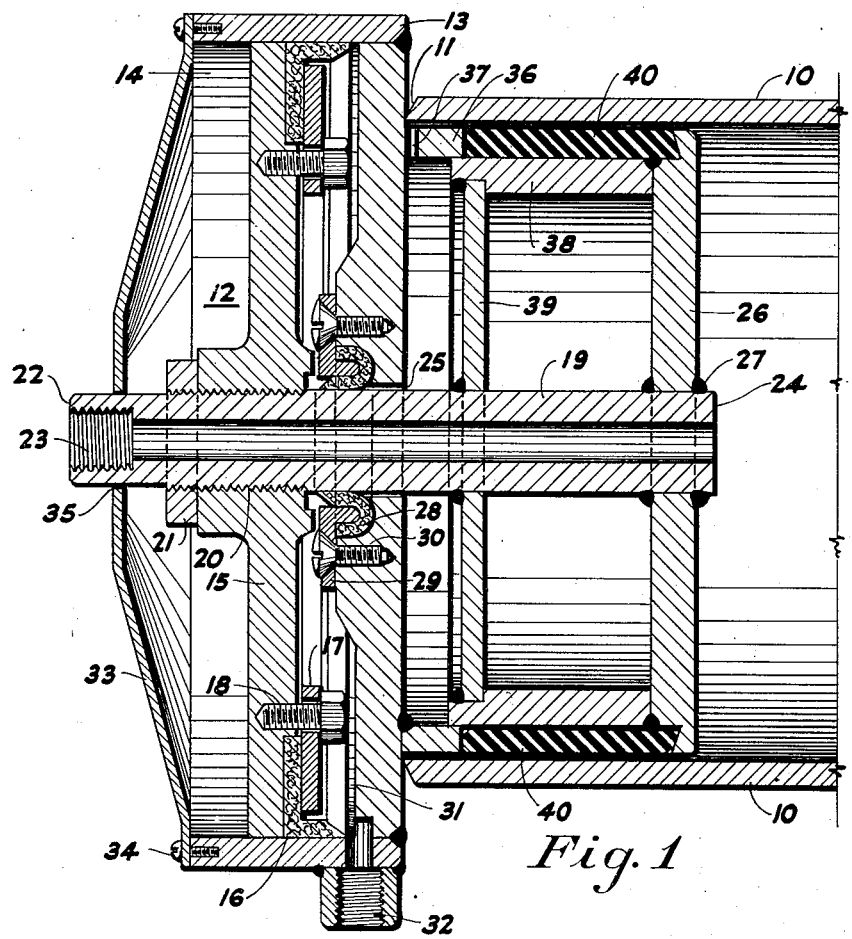
Figure 1 is a longitudinal sectional view of a plug or stopper embodying this invention and in place in the end of a section of pipe to be tested.

Referring to the drawings and particularly to Figure 1, the reference numeral 10 designates one end of the length or section of pipe undergoing test. Pipe 10 may be beveled as at 11, for welding, or may have any other form of end configuration common in the art.

The plug or stopper, generally designated 12, is illustrated as being in place in the end of pipe 10, and may consist of a circular body or frame 13, in which is an enlarged bore 14 and a piston 15. A fluid-tight joint between the periphery of piston 15 and the wall of the bore 14 is made by a packing member 16, held in place by a retaining ring 17 and screws 18.

A hollow shaft 19 is threaded into piston 15 as at 20, and is clamped thereto by nut 21. Shaft 19 extends in both directions from piston 15, the outboard end 22 being threaded internally as at 23 to receive an air hose, through which compressed air for testing may be admitted into pipe 10, as will be described below. The inboard end 24 of the shaft extends through a central bore 25 in frame 13 and is fitted with a follower plate 26 which may be welded as at 27. A packing ring 28, held to frame 13 by retaining ring 29 and screws 30, serves to make a fluid-tight joint between shaft 19 and the wall of the bore 25, so that a fluid-tight chamber 31 is formed beneath piston 15. A threaded opening 32 is provided in frame 13, leading into chamber 31 to admit and release compressed air, as will be described below.

The open end of bore 14 in frame 13 may be protected against damage and the entry of dirt by a cover plate 33 secured by screws 34, and provided with a loosely fitting central opening 35 through which the outboard end 22 of shaft 19 may project.

A spacer ring 36, which centers the stopper 12 in the bore of pipe 10 extends inwardly from and is secured to frame 13, and is provided with a vent hole 37 as shown. A cylindrical guide ring 38 is secured to and extends forwardly from follower plate 26 to spacer plate 39, secured to shaft 19. Ring 38 is a loose fit in the bore of spacer ring 36 just described. Around guide ring 38, and between follower plate 26 and the end of spacer ring 36 is a relatively thin long ring 40 of vulcanized rubber or similar resilient material.

It will now be apparent that if compressed air, for example, is admitted through opening 32 into chamber 31, behind piston 15, the latter will be forced to the left or outwardly, carrying with it shaft 19 and follower plate 26. The resilient ring 40 will be compressed between follower plate 26 and spacer ring 36 and will be deformed radially outwardly into extremely close contact with the wall of the bore of pipe 10. This has been found adequate to make a fluid-tight joint between frame 13 and pipe 10, and also to hold the stopper 12 in place in the pipe, against the force of the test fluid which tends to blow it out, due to the relative areas of rubber in contact with the follower and the pipe and also to its high friction coefficient.

For example, an air pressure of 100 lbs. per sq. inch on a 10 inch diameter piston 15 was found to be ample to hold a stopper 12 of this type in an 8 inch nominal diameter pipe against an internal pressure of 800 lbs. per square inch. Because of the differential areas of piston 15 to the annular area of the end of rubber ring 40 on which follower plate 26 acts, and the external or gripping area against the inner pipe wall of the deformed ring 40, it is obvious that, if the pipe test pressure is applied also to the piston chamber, the plug or stopper can never be blown out of the pipe by the test fluid.

Figure 2:
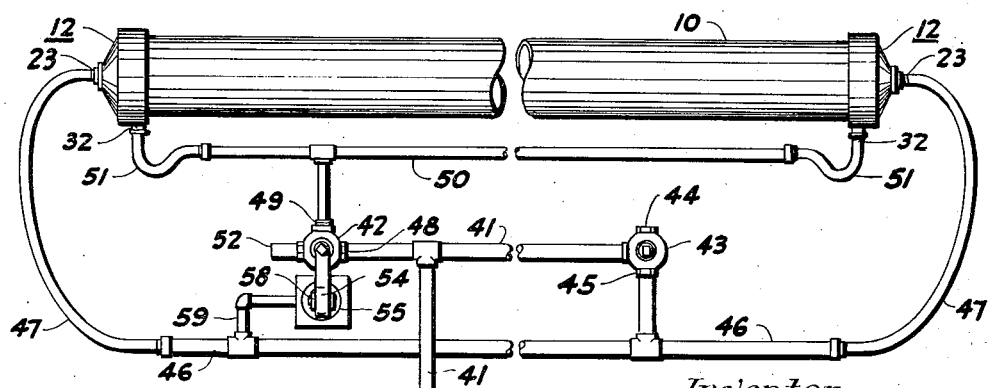
Figure 2 is a diagrammatic plan view of a complete section of pipe undergoing test, with the stoppers and test fluid control equipment in place.

Referring now to Figure 2, which illustrates a length of pipe 10 being tested, two stoppers 12 are inserted in the respective ends of the pipe. A source of compressed air (not shown) is connected to pipe 41, which leads to the inlets of two three-way cocks 42 and 43. Cock 43 has one outlet 44 open to the air, for vent purposes. The other outlet 45 is connected to a pipe 46, on each end of which is a flexible hose 47, each hose leading to the threaded connection 23 in the outboard end of the hollow shaft 19 of the two plugs or stoppers 12. Thus test fluid, in this case air from pipe 41, may be passed through cock 43 through its outlet 45, pipe 46, hose 47 and hollow shaft 19 into the interior of the pipe section 10 undergoing test.

As it is essential that the plugs or stoppers 12 be in their expanded or actuated position in pipe 10, that is, with adequate air pressure in chambers 31 to move the pistons 15 and expand rings 40, during the time that the test air pressure is admitted to the interior of pipe 10, and are so maintained until that pressure has been released, the following means are provided to insure that this must be done.

Referring to Figures 2 and 3, it will be noted that the inlet 48 of three-way cock 42 is connected to the common air supply pipe 41. One outlet 49 of cock 42 is connected to pipe 50, which in turn is provided with a flexible hose 51 on each end, each hose leading to the connection 32 of the piston chamber 31 of stoppers 12. The other outlet of cock 42 is vented to the atmosphere through a short nipple 52.

Cock 42 is preferably mounted on a base 53 as shown in Figure 3, with handle 54, when in position to admit air to chamber 31 in stoppers 12, extending over a small cylinder 55 in which is a spring restrained piston 56. The upper end of piston rod 57 terminates in a fork 58, which receives handle 54 when the piston is in its upper position. A pipe 59 connects the cylinder 55, below the piston, to air pipe 46, so that as long as there is air pressure in the latter, and therefore in the interior of the pipe 10 undergoing test, piston 56, rod 57 and fork 58 will be in the upper position shown, and it will be impossible to turn handle 54 of stopper actuating cock 42 to release the air pressure in the stopper piston chambers 31.

Thus accidental blowing out of the plugs from such a cause is effectively prevented. If air were admitted to pipe 10 by cock 43 before cock 42 were opened to expand the stoppers 12 no damage would result, as the clearance around the relaxed rings 40 allows passage of the air admitted. It is only after the pressure is built up that a release of the stoppers is hazardous. Obviously, if one end of pipe 10 were closed, as by a blind flange, valve, or the like, but one stopper would be required, the operations described, however, being equally applicable.

An alternative form of stopper construction is shown in Figure 4. In this case the body or frame 13' is preferably formed by casting, and is similarly provided with a bore 14'. Piston 15' is also provided with a packing member 16', a retaining ring 17' and screws 18'. Piston 15', however, is fitted with a reduced section 38' which extends inwardly into the bore of pipe 10' and forms the equivalent of guide ring 38. Rubber ring 40' is retained in place on section 38' by a threaded bushing 60, which latter forms the abutment which will compress ring 40' against a corresponding threaded bushing 61 on the inner end of frame 13', when the piston 15' is moved to the left, or outwardly, by pressure in the piston chamber 31'.

Air for actuating the piston 15' is admitted to chamber 31' in body 13' by a threaded connection 32'. Air for testing pipe 10' is admitted thereto through the threaded connection 23' in the center of piston 15'. Lugs 62 may be cast as shown at the top of body 13' to facilitate handling. A narrow packing 63 may be held in groove 64 at the open end of bore 14' to keep out dirt.

Although but one alternative form of the stopper is illustrated and described above, primarily differing but slightly from the preferred embodiment, it is obvious that many modifications may be made without departing from the essential features of the invention. These are believed to include broadly a body adapted to be secured to the end of a pipe or cylindrical body to form a temporary closure therefor, a fluid-actuated piston movable in the body, and a resilient packing and friction member adapted to be deformed by such movement to grip the pipe wall, as well as make a fluid-tight joint therewith.

The ancillary features of the invention also include the means whereby the fluid control valves are interlocked so that the stopper or closure-actuating fluid pressure may not be released before the test fluid is vented from the pipe being tested. While specific constructions have been described and illustrated, it is to be understood that the invention is not limited to those devices and all such modifications and changes as come within the scope of the appended claims are embraced thereby.

I claim:

1. A pipe testing apparatus comprising fluid-actuated means for closing the end of a pipe, a source of fluid pressure, a valve adapted selectively to admit and release pressure fluid to said first named means, operating means for said valve, a second valve adapted selectively to admit and release pressure fluid to said pipe to test the same, and interlocking means responsive to the position of said second valve and adapted to engage the operating means for said first valve, whereby said first valve will be retained in position to admit pressure fluid to said fluid actuated means so long as said second valve is in position to admit pressure fluid to said pipe.

2. A pipe testing apparatus according to claim 1, in which said interlocking means is adapted to be actuated by pressure fluid from said second named valve.

3. A pipe testing apparatus according to claim 1, in which said interlocking means comprises a cylinder connected to the outlet of said second valve, a piston in said cylinder, a rod for said piston, and means on said rod adapted to engage the operating means for said first valve when pressure fluid is admitted to said cylinder by said second valve.

4. A testing apparatus comprising fluid actuated means for closing the end of a pipe or the like, a source of fluid pressure, valve means adapted selectively to admit and release pressure fluid to said first named means, a second valve means adapted selectively to admit and release pressure fluid to said pipe to test the same, and means adapted to be interlockingly connected to said first valve means to prevent release of pressure fluid from said fluid actuated means without first releasing the pressure fluid from said pipe.

5. A pipe testing apparatus comprising a body, a bore in said body, a piston movably mounted in said bore and adapted to be actuated by fluid pressure, a follower secured to said piston and adapted to be received in the bore of said pipe, and a resilient ring between said body and said follower, said ring adapted to be deformed radially, by a movement of said piston and follower with respect to said body, to engage said pipe and hold said body in place thereagainst.

6. A pipe testing apparatus according to claim 5, with the addition of means for admitting fluid pressure through said piston to the bore of said pipe to test the same.

7. A pipe testing apparatus according to claim 5 in which the radial thickness of said resilient ring is less than its length, and with the addition of means for admitting a like fluid pressure through said piston to the bore of said pipe to test the same, whereby the gripping force of the radially deformed resilient ring will be greater than the force exerted against said body to blow it out of said pipe.

8. A pipe testing apparatus comprising a body, one end of which is adapted to be inserted into the end of the pipe to be tested, a resilient member carried by said end, and means in the opposite end of said body adapted to be actuated by fluid pressure to deform said resilient member to engage said pipe and hold said body in place thereon, said last named means being larger in diameter than the bore of said pipe, so that the same pressure may be used therein as in testing said pipe, without blowing said body from said pipe.

WILLIAM R. POSTLEWAITE.